(12) United States Patent
Tu (10) Patent No.: US 6,731,831 B2
(45) Date of Patent: May 4, 2004

(54) OPTICAL SWITCH ARRAY ASSEMBLY FOR DNA PROBE SYNTHESIS AND DETECTION

(76) Inventor: Xiang Zheng Tu, 1293 Westwood St., Redwood City, CA (US) 94061

( * ) Notice: Subject to any disclaimer, the term of this patent is extended or adjusted under 35 U.S.C. 154(b) by 66 days.

(21) Appl. No.: 10/083,878

(22) Filed: Feb. 27, 2002

(65) Prior Publication Data

US 2003/0161575 A1 Aug. 28, 2003

(51) Int. Cl.[7] .................................................. G02B 6/35
(52) U.S. Cl. .................................... 385/16; 385/12
(58) Field of Search ........................ 385/12, 13, 16–23

(56) References Cited

U.S. PATENT DOCUMENTS

| | | | | |
|---|---|---|---|---|
| 5,963,682 A | * | 10/1999 | Dorschner et al. | 385/16 |
| 6,163,635 A | * | 12/2000 | Helble | 385/19 |
| 6,408,120 B1 | * | 6/2002 | Dautartas | 385/52 |
| 2002/0154854 A1 | * | 10/2002 | Tayebati et al. | 385/18 |

OTHER PUBLICATIONS

Toshiyoshi et al., "Electrostatic Micro Torsion Mirrors for an Optical Switch Matrix", Journal of Microelectromechanical Systems vol. 5, No. 4, Dec. 1996, pp. 231–237.*

* cited by examiner

*Primary Examiner*—Akm Enayet Ullah
*Assistant Examiner*—Michelle R. Connelly-Cushwa
(74) *Attorney, Agent, or Firm*—Bruce H. Johnsonbaugh (57) ABSTRACT

An optical switch array assembly for DNA probe light synthesis and hybridized DNA probe light detection is composed of a silicon substrate, an optical switch array disposed in the substrate, a glass plate mounted on the top of the substrate, and a DNA probe array disposed on the surface of the glass plate. The substrate also contains a driving circuit for forcing each optical switch on and off and an addressing circuit for locating each optical switch. A plurality of holes is disposed in the substrate so that each hole is aligned with an optical switch and guides a light beam to a corresponding optical switch.

7 Claims, 5 Drawing Sheets

OPTICAL SWITCH ARRAY ASSEMBLY FOR DNA PROBE SYNTHESIS AND DETECTION

FIELD OF THE INVENTION

This invention relates generally to an optical switch array assembly for DNA probe light synthesis and hybridized DNA probe light detection, and particularly to a micromachined optical switches array assembly that can be selectively actuated for DNA probe light synthesis and hybridized DNA probe light detection.

BACKGROUND OF THE INVENTION

With the advance of the human genome program, there is a strong movement to diagnose diseases and understand life phenomena by understanding living bodies on the basis of DNA. The main objective of DNA diagnosis is the development of a simple, accurate and cheep technique for DNA screening. The newly developed DNA chips represent a powerful technique for DNA screening. DNA chips have small size, allow a large reduction of sample and reagent consumption, are quick and can be used simply by untrained operators.

DNA arrays have been synthesized using light-directed methods. As an example, light-directed synthesis of oligonucleotides employs 5'-protected nucleosidephosphoramidite "building blocks." The 5'-protecting groups may be either photolabile or acid-labile. A plurality of DNA sequences in predefined regions are synthesized by repeated cycles of deprotection and coupling. Coupling occurs only at sites that have been deprotected. Three methods of light-directed synthesis are: use of photolabile protecting groups and direct photodeprotection; use of acid-labile 4,4'-dimethoxytrityl (DMT) protecting groups and a photoresist; use of DMT protecting groups and a polymer film that contains a photoacid generator (PAG). These methods have many process steps similar to those used in semiconductor integrated circuit manufacturing. These methods also often involve the use of masks that have a predefined image pattern that permits the light used for synthesis of the DNA arrays to reach certain regions of a substrate but not others. The pattern formed on the mask is projected onto a substrate to define which portions of the wafer are to be deprotected and which regions remain protected. In many cases a different mask having a particular predetermined image pattern is used for each separate masking step, and synthesis of a substrate containing many chips requires a plurality of masking steps with different image patterns. For example, synthesis of an array of 20 mers typically requires approximately seventy photolithographic steps and related unique masks. So, using present photolithographic systems and methods, a plurality of different image pattern masks must be pre-generated and changed in the photolithographic system at each masking step. A direct write optical lithography system has been developed to improve the cost, quality, and efficiency of DNA array synthesis by providing a maskless optical lithography system and method where predetermined image patterns can be dynamically changed during photolithographic processing. As such, an optical lithography system is provided to include a means for dynamically changing an intended image pattern without using a mask. One such means includes a spatial light modulator that is electronically controlled by a computer to generate unique predetermined image patterns at each photolithographic step in DNA array synthesis. The spatial light modulators can be, for example, micromachined mechanical modulators or microelectronic devices. One type of mechanical modulator is a micro-mirror array that uses small metal mirrors to selectively reflect a light beam to particular individual features; thus causing the individual features to selectively receive light from a light source (i.e., turning light on and off of the individual features).

Another type of mechanical modulator is designed to modulate transmitted rather than reflected light. An example of a transmission spatial light modulator is a liquid crystal display (LCD). There are a number of drawbacks with this direct write optical lithography system. First, the system consists of several optical active mechanical alignment apparatus including a mechanism for aligning and focusing the chip or substrate, such as an x-y translation stage and a stepping-motor-driven translation stage for moving the substrate by a distance equal to the desired center-to-center distance between chips. The mass production of the DNA probe arrays spends much labor and time and therefore they are very expensive. Particularly when the density of the cells where the probes are fixed, respectively, in a probe array is large, it is getting difficult to produce the probe array at a low cost.

Second, a complicated apparatus is required for optical detection of a hybridized DNA probe array. This apparatus may involve among others moving a sample substrate while simultaneously detecting light transmitted from one or more sample sites on the substrate by sequentially tracking the sample sites as they move. A stage, movable in a first direction, supports the substrate. A detector detects light emanating from an examination region delimited by a detection initiation position and a detection termination position. An optical relay structure transmits light from the examination region to the detector. A scanning mechanism simultaneously moves the optical relay structure and the substrate in the first direction. The optical relay structure tracks the substrate between the detection initiation position and the detection termination position.

SUMMARY OF THE INVENTION

The present invention is made for removing the above disadvantages, and an object of the present invention is to provide an optical switch array assembly for DNA probe light synthesis and hybridized DNA probe light detection without any moving apparatus for light alignment and probes tracking.

Another object of the present invention is to provide an optical switch array assembly that is integrated in a substrate with an optical switch array and at least a driving circuit so that not only each site but also each group of sites for DNA probe synthesis can be selectively illuminated.

Still another object of the present invention is to provide an optical switch array that is integrated in a substrate with an optical switch array and at least a driving circuit so that not only each hybridized DNA probe but also each group of hybridized DNA probes can be selectively illuminated for light detection.

Still another object of the present invention is to provide an optical switch array assembly that is integrated in a substrate with an optical switch array and at least a driving circuit so that all sites for DNA probe light synthesis can be directly illuminated without any interference with the reactive liquid.

Still another object of the present invention is to provide an optical switch array assembly that is integrated in a substrate with an optical switch array and at least a driving circuit so that all hybridized DNA probes can be directly illuminated without any cross talk between the adjacent hybridized probes.

Still another object of the present invention is to provide an optical switch array assembly composed of an optical switch array and at least a driving circuit can be batch produced simply using integrated circuit technology and micromachining technology.

Still another object of the present invention is to provide an optical switch array assembly for DNA probe light synthesis and hybridized DNA probe light detection that is simple, cheap and timesaving.

Still another object of the present invention is to provide an optical switch array assembly for DNA probe light synthesis and hybridized DNA probes light detection that can be operated in any laboratory and any hospital.

In order to achieve the above object, in the present invention, an optical switch array assembly is composed of a silicon substrate, an optical switch array disposed in the substrate, a glass plate mounted on the top of the substrate, and a DNA probe array disposed on the surface of the glass plate. The substrate also contains a driving circuit for forcing each optical switch or each group of optical switches on and off and perhaps an addressing circuit for locating each optical switch or each group of optical switches. A plurality of holes is also created in the substrate so that each hole is aligned with an optical switch on the backside and guides an optical beam to the optical switch.

The optical switches are constructed from two parallel thin film mirrors separated by an air gap. As well known, the transmission T of a loss less Fabry-Perot cavity is a function of the reflectivities $R_1$ and $R_2$ of the mirrors and of the air gap h between the mirrors:

$$T=[(1-R_1)(1-R_2)]/[(1-\sqrt{R_1R_2})^2+4\sqrt{R_1R_2}sin_2(2\pi h/\lambda)$$

where $\lambda$ is the working light wavelength.

This expression has maximum and minimum when the sine in the denominator is respectively zero and one. Thus for h being a multiple of $\lambda/4$, the transmission becomes $$T_{max}=[(1-R_1)(1-R_2)]/(1-\sqrt{R_1R_2})^2 \text{ for } h=0,\lambda/2,\lambda \ldots$$

$$T_{min}=[(1-R_1)(1-R_2)]/(1+\sqrt{R_1R_2})^2 \text{ for } h=\lambda/4,3\lambda/4 \ldots$$

The reflectivity of the Fabry-Perot cavity can be become zero only if the mirrors are of equal reflectivity. In this case the above equation is always equal to one. Thus, to get a maximal contract and a maximum reflectivity of the Fabry-Perot cavity, the reflectivities R1 and $R_2$ of the thin film mirrors must be as equal as possible and as high as possible.

It is also known that the reflectivities R1 and R2 of the thin film mirrors are maximum if their thickness is an odd multiple of $\lambda/(4n)$, where n is the refractive index of the mirrors material. In this case $R_1$ and $R_2$ of the thin film mirrors can be expressed by $$R_{1,2}=\left(\frac{n^2-n_0}{n^2+n_0}\right)^2$$

where $n_0$ is the refractive index of the underlying medium.

In the present invention the thin film mirrors are made of amorphous silicon carbide or plasma enhanced chemical vapor deposition (PECVD) silicon nitride or lower pressure vapor chemical deposition (LPCVD) silicon nitride. For ultraviolet light silicon dioxide, silicon nitride and silicon carbide are transparent, thus there is no light loss due to absorption. It has been reported that the refractive index of amorphous silicon carbide is 2.48 to 2.65, and the refractive index of silicon nitride is 2.0 to 2.1.

For a freestanding thin film membrane the underlying medium is air and $n_0=1$. Thus the above equation yields values of 52%–56% for $R_{1,2}$ of amorphous silicon carbide and 40–36% for $R_{1,2}$ of silicon nitride.

The optical switches based on the Fabry-Perot cavity are operated by electrostatic force. The top mirror of the Fabry-Perot cavity is supported by several flexible beams. Without a voltage applied to the cavity, h equals to odd multiple of $\lambda/4$ so that the transmission of the cavity reaches minimum or the switch is closed. With a voltage applied to the cavity, the flexible beams bend down and the supported mirror moves towards the bottom mirror so that h equals to even multiple of $\lambda/4$. As a result, the transmission of the cavity reaches maximum or the optical switch is opened. As shining light is perpendicularly projected on the backside of the substrate, each hole guides a light beam to a corresponding optical switch. When the optical switch is opened or closed the light beam proceeds forward along the extension direction of the hole or is reflected along a reverse direction.

The applied voltage is directed to a set of selective optical switches by the combination of a driving circuit and an addressing circuit. The driving circuit may be an electrical switch array. The addressing circuit may be a shift register circuit. Both the driving circuit and the addressing circuit may be partially or fully integrated in a same silicon substrate with the optical switch array.

Synthesizing DNA array with the optical switch array assembly using the DMT process may take place as follows. First, a computer file is generated and specifies, for each light illumination step, which optical switches in the optical switch array assembly need to be on and which need to be off to generate a particular predetermined light illumination pattern. Second, the glass plate of the optical switch array assembly is coated with photoresist on the synthesis surface and the optical switch array assembly is mounted in a holder or flow cell so that the synthesis surface is applied with DMT-protected nucleotides containing the desired base (adenine (A), cytosine (C), guanine (G), or thymine (T)). The photoresist may be either positive or negative thus allowing deprotection at locations exposed to the light or deprotection at locations not exposed to the light, respectively. Thirdly, the optical switch array is programmed for the appropriate configuration according to the desired predetermined light illumination pattern, a shutter in an arc lamp is opened, the synthesis surface is illuminated for the desired amount of time, and the shutter is closed. Fourth, the photoresist is developed and etched. Exposure of the glass plate to acid then cleaves the DMT protecting groups from regions of the glass plate where the photoresist has been removed. The remaining photoresist is then stripped. Fifth, DMT-protected nucleotides are coupled to the deprotected oligonucleotides. Sixth, the glass plate of the optical switch array assembly is re-coated with photoresist. These steps are repeated until the DNA array synthesis is complete.

In the analysis procedure, at first, all the components in the sample are labeled with tags such as fluorophores or enzymes. They are placed on the glass plate of the optical switch array assembly for hybridization. If the sample has a component being hybridized with probes on the glass plate, the component is held on the corresponding regions.

The positions of the region emitting fluorescence can be determined by selectively opening the corresponding optical switches of the optical switch array assembly. From the positional information of the fluorescence emitting regions, the probe species being hybridized with the sample components can be determined.

BRIEF DESCRIPTION OF THE INVENTION

FIG. 1A is a schematic diagram showing a DNA probe of an optical switch array assembly of the present invention being synthesized by projecting a light beam on a predetermined site by switching an optical switch on.

FIG. 1B is a schematic diagram showing a hybridized DNA probe of an optical switch array assembly of the present invention being detected by projecting a light beam on the hybridized DNA probe by switching an optical switch on.

DETAILED DESCRIPTION OF THE INVENTION

Figure 1A:
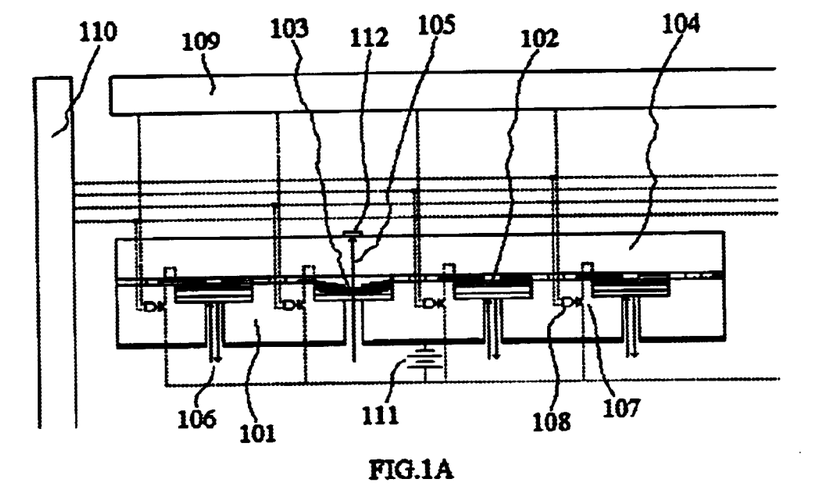
Figure 1B:
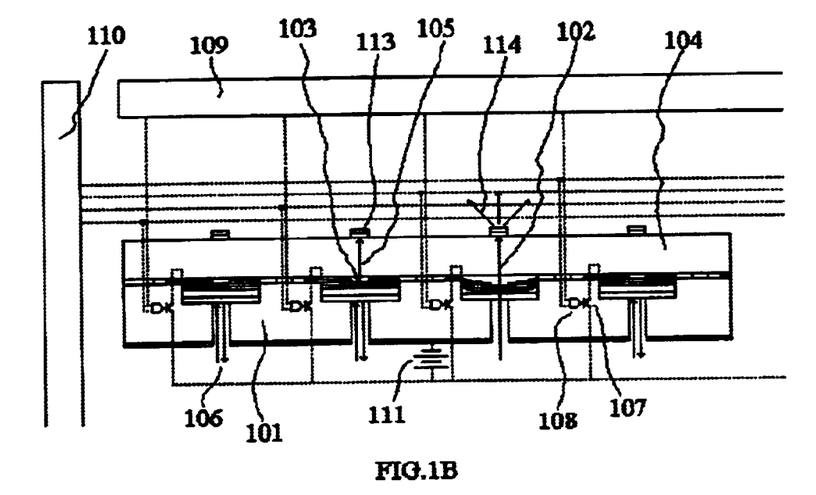

An optical switch array assembly of the present invention is shown in FIG. 1A and FIG. 1B. As shown in FIG. 1A, the optical switch array assembly consists of a silicon substrate 101, a plurality of closed optical switches 102 and a plurality of opened optical switches including an opened optical switches 103 that are disposed in the silicon substrate 101, a glass plate 104 mounted on the top of the silicon substrate 101 with the periphery sealed, and a plurality of DNA probes including DNA probe 112 disposed on the surface of the glass plate 104. The optical switch array assembly also comprises a plurality of electrical switches 107 and a plurality of logic gates 108 addressed by a vertical shift register circuit 109 and a horizontal shift register circuit 110 for applying a voltage 111 to the optical switches. The electrical switches, the logic gates, and perhaps the register circuits are disposed in the silicon substrate 101. The backside of the silicon substrate 101 is illuminated by a light source. A plurality of the optical switches including optical switch 102 is off and the light beams indicated by number 106 are reflected back. A plurality of the optical switches including optical switch 103 is on and the light beam indicated by number 105 proceeds forward and reaches the front surface of the glass plate 104. This induces the DNA probes including DNA probe indicated by number 112 being synthesized on the light illuminated sites of the glass plate 104.

As shown in FIG. 1B, the optical switch array assembly has the same indication members as the optical switch array assembly shown in FIG. 1A, except that the DNA probe 112 is hybridized with a fluorophore tag attached sample DNA and therefore become a hybridized DNA probe 113. Under illumination the hybridized DNA probe 113 can emit fluorescence 114. Then the fluorescence can be detected by a photodetector. It is supposed that the kind of the DNA probe 112 is known. So when the hybridized DNA probe 113 is illuminated by selectively opening a corresponding optical switch, the kind of the sample DNA can be determined by addressing the location of the opened optical switch.

Figure 2:
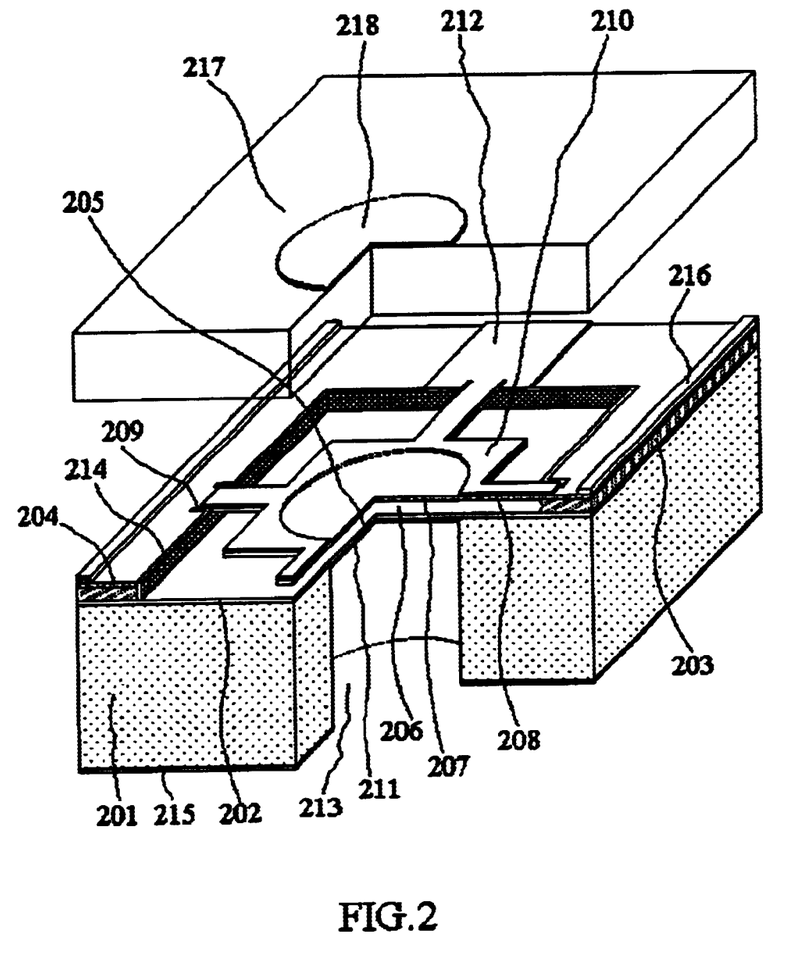
FIG. 2 is a perspective view of a cell cut from an optical switch array assembly of the present invention, which comprises an optical switch and a DNA probe.

A single cell of a DNA probe array assembly of the present invention is shown in FIG. 2. The cell comprises a silicon substrate 201, a first amorphous silicon carbide layer 202, a silicon dioxide layer 203, and a second amorphous silicon carbide layer 204 which are sequentially laminated on the surface of the silicon substrate 301, and a Fabry-Perot cavity disposed in the silicon substrate 201. The Fabry-Perot cavity is constructed of a first amorphous silicon carbide membrane 205, an air gap 206, and a second amorphous silicon carbide membrane 207. The second amorphous silicon carbide membrane 207 is supported by four amorphous silicon carbide beams 208. Each amorphous silicon carbide beam 208 is connected to the silicon substrate 201 through two anchors 209. A metal electrode 210 covers the amorphous silicon carbide beams 208 and the outer portion of the second amorphous silicon carbide membrane 207. The first amorphous silicon membrane 205 is coated with an anti-reflective layer 211 on the backside and aligned with an opened back hole 213. The area occupied by the Fabry-Perot cavity, is surrounded by etch stop walls 214. Each anchor 209 is connected to an etch stop wall 214. A reflective layer 215 is coated on the backside of the silicon substrate 301. A glass plate 217 is mounted on the top of the silicon substrate through two spacers 216. A DNA probe 218 is positioned on the front surface of the glass plate 217 and aligned with the bottom hole 213.

The thicknesses of the first amorphous silicon carbide membrane 205 and the second amorphous silicon carbide membrane 207 are designed to be equal to odd multiple of $\lambda/(4n_{SiC})$ so as to set their reflectivities to take maximum value, respectively. The original or static thickness of the air gap 206 is designed to be equal to odd multiple of $\lambda/4$ so as to set the Fabry-Perot cavity to be in a minimum transmission state or a full reflective state.

Since the resistivity of the amorphous silicon carbine ranges from $10^{10}$ to $10^{14}$ ohm-cm, the electrode 210 can combine with the silicon substrate 201 to form a parallel plate capacitor. When a voltage apply to the capacitor, a resulted electrostatic force pulls the second amorphous silicon carbide membrane 207 down to the first amorphous silicon carbide membrane 205 and therefore reduce the thickness of the air gap 206. As soon as the thickness of the air gap equals to even multiple of λ/4, the Fabry-Perot cavity is driven into a maximum transmission state.

The DNA probe 218 is generated by light illumination. The shape and the size of the DNA probe 218 are duplicated from the hole 213 because the light beam is introduced through the hole 213.

As an alternative, the mirrors of the Fabry-Perot cavity are made of PECVD silicon nitride instead of amorphous silicon carbide. In this case the stack structure of amorphous silicon carbide layer—silicon dioxide layer—amorphous silicon layer is replaced by a stack structure of PECVD silicon nitride layer—aluminum—PECVD silicon nitride layer.

As another alternative, the mirrors of the Fabry-Perot cavity are made of LPCVD silicon nitride instead of amorphous silicon carbide. In this case the stack structure of amorphous silicon carbide layer—silicon dioxide layer—amorphous silicon layer is replaced by a stack structure of LPCVD silicon nitride layer—silicon dioxide—LPCVD silicon nitride layer.

Figure 3:
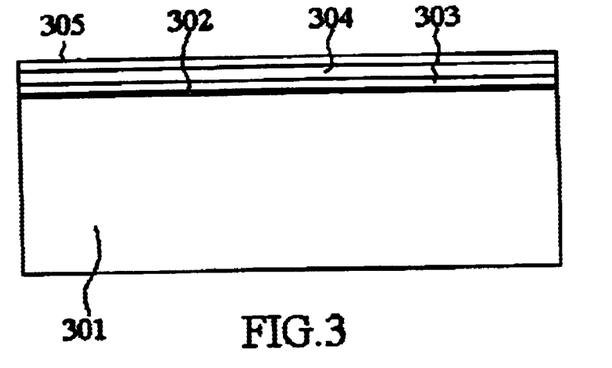
FIG. 3 is a cross-sectional view of an optical switch of the present invention at a first fabrication step in which a first silicon dioxide layer, a first amorphous silicon carbide layer, a second silicon dioxide layer, and a second amorphous silicon carbide layer have been deposited on the surface of a silicon substrate.

A first preferred fabrication process of the DNA probe array assembly of the present invention comprises eight steps as shown in FIG. 3 to FIG. 10. The first step as shown in FIG. 3, is to prepare a silicon substrate 301 and deposit a stack structure of a first silicon dioxide layer 302, a first amorphous silicon carbide layer 303, a second silicon dioxide layer 304, and a second amorphous silicon carbide layer 305. The silicon substrate 301 may have been undergone a standard MOSFET processing process. The MOS process is to fabricate a plurality of MOS circuits including MOSFET switches arrays, MOS gate circuits, and perhaps shift registers circuits (not shown in the figure). The first silicon dioxide layer 302 is deposited by PECVD and has a thickness little larger than $\lambda/(4n_{SiO_2})$ so that after completing a subsequent hole formation process the thickness is just $\lambda/(4n_{SiO_2})$. Deposition parameters used are power of 250 W, temperature of 300 centigrade, $N_2O$ flow of 400 sccm, $SiH_4$ flow of 40 sccm and pressure of 240 mtorr, resulting in a deposition rate of 600 angstrom/min. The first amorphous silicon carbide layer 303 is deposited by PECVD and has a thickness of odd multiple of $\lambda/(4n_{SiC})$. The deposition system used is a dual frequency reactor. Deposition parameters used are 600 mTorr, 10 sccm $SiH_4$, 250 sccm $CH_4$, 300 sccm Ar, 300 centigrade, and a power level of 60 W. A resulted amorphous silicon carbide layer 303 has low stress of <50 MPa and high etch resistance. The second silicon dioxide layer 304 is deposited by a same PECVD process as above described and has a thickness of odd multiple of λ/4. The second amorphous silicon carbide layer 305 is deposited by a same PECVD as above described and has a thickness of odd multiple of $\lambda/4n_{SiC}$). It is preferred that the thickness of the first amorphous silicon carbide layer 303 is much larger than thickness of the second amorphous silicon carbide layer 305 so that the first amorphous silicon carbide layer 303 has a higher mechanical strength.

Figure 4:
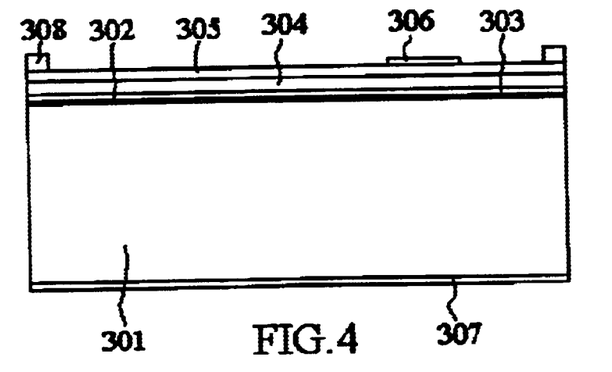
FIG. 4 is a cross-sectional view of an optical switch of the present invention at a second fabrication step in which an electrical interconnection, two spacers, and a metal reflective layer have been formed on the two sides of the silicon substrate, respectively.

The second step as shown in FIG. 4, is to create an electrical interconnection 306, a back reflective layer 307, and two spacers 308. To do this, a 1500 angstrom thick aluminum is deposited on the both sides of the silicon substrate 301 by electron beam evaporation. Patterning the aluminum layer is carried out using an aluminum etch solution of $H_3PO_4$:HAC:$CH_3COOH$=8:0.5:0.1:1. Then another patterned photoresist layer is formed on the front surface of the silicon substrate 301. Using the patterned aluminum layer as a base, a 3 micron thick aluminum layer is deposited. Removing the photoresist layer under the aluminum layer results in two aluminum tops mounted on the spacer 308. In this way, the thickness of the spacers 308 is increased to be larger than 3 microns, but the thickness of the electrical interconnection 307 is still kept unchanged.

Figure 5:
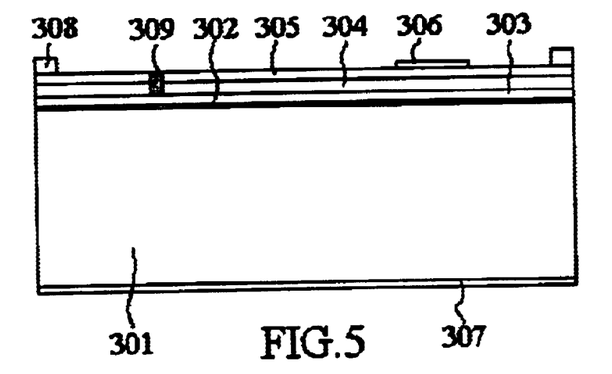
FIG. 5 is a cross-sectional view of an optical switch of the present invention at a third fabrication step in which a refilled trench has been created in the silicon substrate.

The third step as shown in FIG. 5, is to form a refilled etch stop trench 309 and anchors (not shown in the figure). Firstly, a trench is created in the second amorphous silicon carbide layer 305 and the second silicon dioxide layer 304. Patterning of the second amorphous silicon carbide 305 is done by dry etching in a reactive ion etcher (RIE) with a power of 60 W and a pressure of 0.05 mbar. The gas flows are 70 sccm $CF_4$, 10 sccm $SF_6$ and 10 sccm $O_2$, respectively. In these conditions an etch rate of 800 angstrom/min is obtained. The etch selectivities to oxide and photoresist are 1.2 and 0.7, respectively. The second silicon dioxide layer 304 is then etched in a diluted HF solution. Finally, the trench is refilled with a sandwiched plug. To this end, a lining layer of amorphous silicon is deposited by PECVD using a patterned photoresist layer as a mask. Then a central layer of silicon nitride is deposited by PECVD. The composite layer of the amorphous silicon and the amorphous nitride which is disposed in the outer portion of the refilled trench, is lifted off by resolving the underlying photoresist layer.

Figure 6:
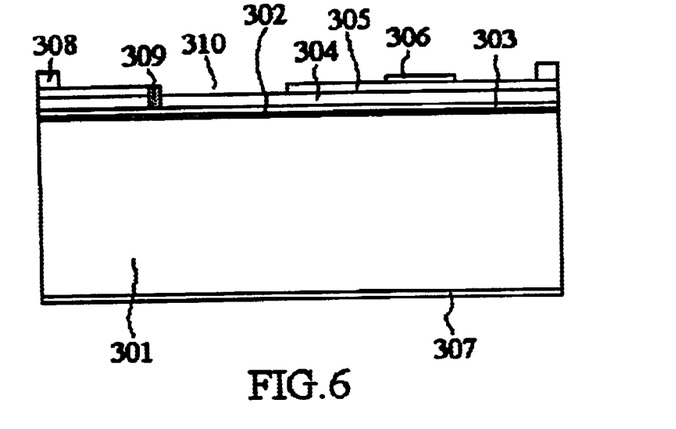
FIG. 6 is a cross-sectional view of an optical switch of the present invention at a fourth fabrication step in which a plane configuration of a Fabry-Perot cavity has been defined in the silicon substrate.

The fourth step as shown in FIG. 6, is to define the plane layout of a Fabry-Perot cavity. The second amorphous silicon carbide layer 305 is patterned again. Etching of the amorphous silicon carbide layer 305 is performed by a same process as above described. After etching a window 310 is created and the refilled trench 309 now becomes an etch stop wall 309.

Figure 7:
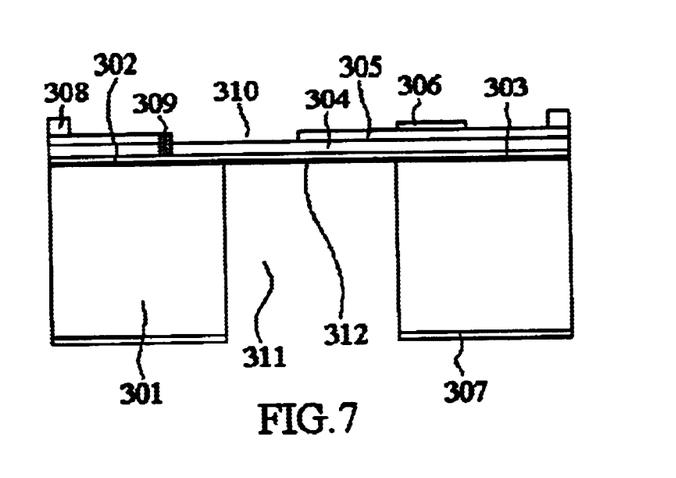
FIG. 7 is a cross-sectional view of an optical switch of the present invention at a fifth fabrication step in which a light beam guiding hole has been created on the backside of the silicon substrate.

The fifth step as shown in FIG. 7, is to create a hole 311 on the backside of the silicon substrate 301. To do this, a 9–10 micron thick positive photoresist is applied and patterned to form an etch open. The aluminum layer in the open is etched by a same process as above described. Then the revealed silicon in the open is etched in a Bosch etcher. The etch proceeds almost through the silicon substrate 301 and finely stops on the first silicon dioxide layer 302. The diameter of the hole 311 on the bottom ranges from 4 to 30 microns, typically 10 microns. The revealed portion of the first silicon dioxide layer 302 is little etched and therefore can be used as an anti-reflective film 312.

Figure 8:
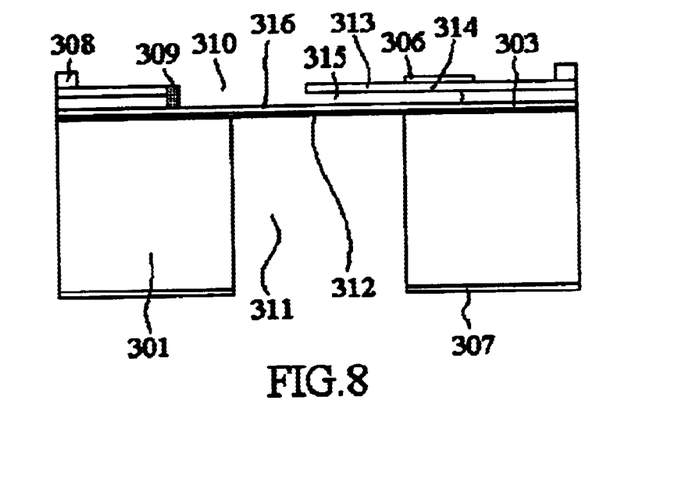
FIG. 8 is a cross-sectional view of an optical switch of the present invention at a seventh fabrication step in which an air gap has been formed in the silicon substrate and therefore a Fabry-Perot cavity based optical switch has been constructed.

The sixth step as shown in FIG. 8, is to etch the second silicon dioxide layer 304 surrounding by the etch stop walls including etch stop wall 309. As a result, a first amorphous silicon carbide membrane 313, four amorphous silicon carbide beams 314, an air gap 315, and a second amorphous silicon carbide membrane 316 are constructed. The two opposite side edges of each amorphous silicon carbide beam 314 are supported by two anchors formed in the process for creating the refilled trenches 309. The size of the first amorphous silicon carbide membrane 313 ranges from 4×4 to 50×50 microns, typically 20×20 microns. The length and width of the amorphous silicon carbide beams 314 range from 4 to 30 microns, typically 10 microns, and from 1 to 5 microns, typically 2 microns, respectively.

Figure 9:
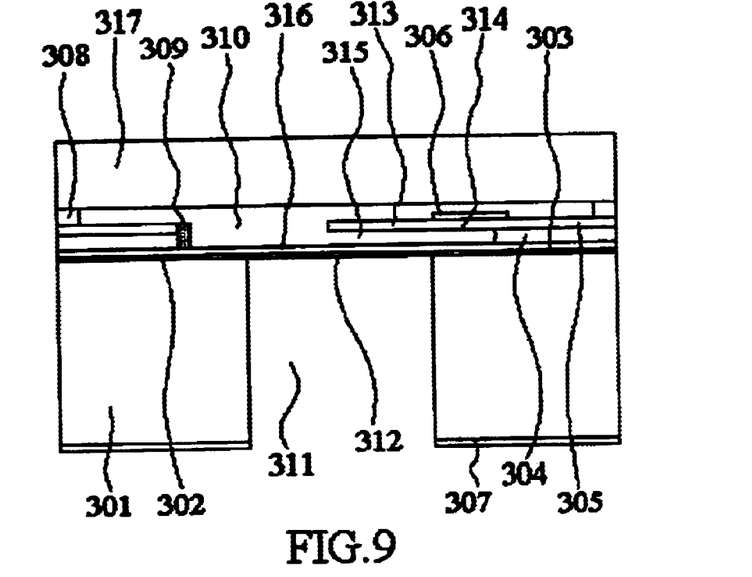
FIG. 9 is a cross-sectional view of an optical switch of the present invention at an eighth fabrication step in which a glass plate has been mounted on the top of the silicon substrate.

The seventh step as shown in FIG. 9, is to mount a glass plate 317 on the top of the silicon substrate 301 through the spacers 308. The backside of the glass plate 316 may be coated with an anti-reflective layer. The periphery of the glass plate 316 may be sealed to protect the optical switches during a subsequent DNA synthesis process. The glass plate 317 is disposable, but the optical switch array may be used repeatedly. So it is preferable that the sealing means is detachable.

Figure 10:
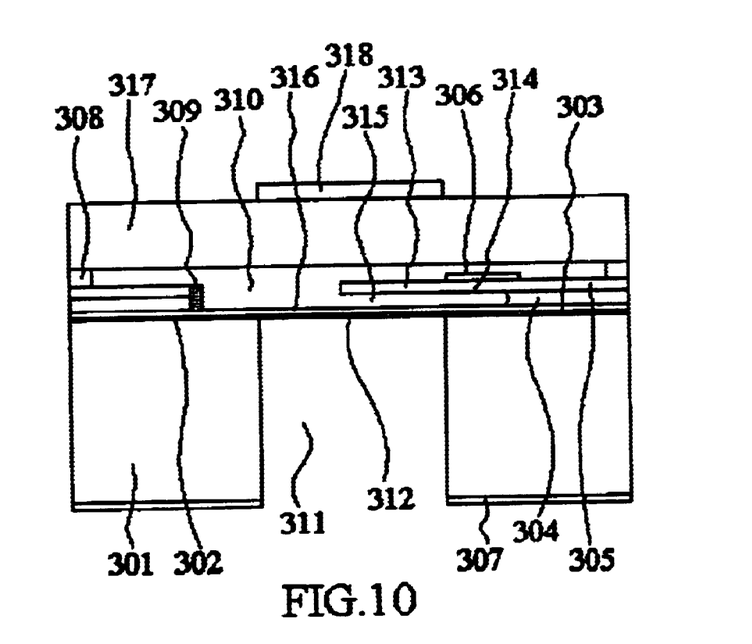
FIG. 10 is a cross-sectional view of an optical switch of the present invention at a ninth fabrication step in which a DNA probe has been synthesized on the surface of the glass plate.

The eighth step as shown in FIG. 10, is to synthesize DNA probes including DNA probe 318 on the surface of the glass plate 317. The DNA probes including DNA probe 318 are synthesized using photolabile protecting groups and direct photodeprotection. In this approach, the surface of the glass plate 317 is modified with photolabile protecting groups. A first group of sites for DNA probe synthesis are illuminated through a first group of the opened optical switches, yielding reactive hydroxyl groups thereon. A 3' activated deoxynucleoside, protected at the 5' hydroxyl with a photolabile group, is then provided to the surface such that coupling occurs at the sites. Following capping, and oxidation, the glass plate 317 is rinsed and a second group of sites are illuminated through a second group of the optical switches to expose additional hydroxyl groups for coupling. A second 5' protected activated deoxynucleoside base is presented to the surface. The selective photodeprotection and coupling cycles are repeated until a desired set of probes is obtained.

As an alternative, the DNA probes including DNA probe 318 are synthesized using acid-labile 4,4'-dimethoxytrityl (DMT) protecting groups and a photoresist.

As another alternative, the DNA probes including DNA probe 318 are synthesized using DMT protecting groups and a polymer film that contains a photoacid generator (PAG).

A second preferred fabrication process of the DNA probe array assembly of the present invention utilizes a stack structure of a first aluminum layer, a first PECVD silicon nitride layer, a second aluminum layer, and a second PECVD silicon nitride layer instead of the stack structure of a first silicon dioxide layer, a first amorphous silicon carbide layer, a second silicon dioxide layer, and a second amorphous silicon carbide layer. The difference between the two processes includes the following items:

1. Deposition parameters used for the PECVD nitride layer are $SiH_4$ 170 sccm, $NH_3$ 30 sccm, temperature 300 centigrade, pressure 450 mtorr, power 250 w, resulting in a deposition rate of 160 angstrom/min.
2. RIE etching parameters used for the PECVD nitride layer are $CHF_4$ 7.5 sccm, $N_2$ 42.5 sccm, power 60W, and pressure 37.5 mtorr, resulting in an etch rate of 250 angstrom/min.
3. The refilled trenches or etch stop walls are refilled with silicon dioxide instead of both amorphous silicon and silicon dioxide.
4. The first aluminum layer revealed by creating a hole needs to be removed by etching, and then a $\lambda/(4n_{SiO_2})$ thick silicon dioxide layer is deposited thereon to form an anti-reflective film.

A third preferred fabrication process of the DNA probe array assembly of the present invention utilizes a stack structure of a first silicon dioxide layer, a first LPCVD silicon nitride layer, a second silicon dioxide layer, and a second LPCVD silicon nitride layer instead of the stack structure of a first silicon dioxide layer, a first amorphous silicon carbide layer, a second silicon dioxide layer, and a second amorphous silicon carbide layer. The difference between the two processes includes the following items:

1. The MOSFET circuits disposed in the silicon substrate have not undergone a metallization step at the beginning of the fabrication process.
2. Deposition parameters used for the LPCVD nitride layer are $SiH_2Cl_2$ 170 sccm, $NH_3$ 30 sccm, temperature 850 centigrade, pressure 150 mtorr, power 400 w, resulting in a deposition rate of 90 angstrom/min.
3. RIE etching parameters used for the LPCVD nitride layer are $CHF_4$ 7.5 sccm, $N_2$ 42.5 sccm, power 60W, and pressure 37.5 mtorr, resulting in an etch rate of 250 angstrom/min.
4. Metallization for creating electrical interconnections (including interconnections for prefabricated circuits) and spacers is carried out as a final fabrication step.

The above description is illustrative and not restrictive. Many variations of the invention will become apparent to those of skill the art upon review of this disclosure. Merely by way of preferred embodiment, while the invention is illustrated primarily with regard to a Fabry-Perot cavity based optical switch array assembly, the invention is not so limited. The scope of the invention should, therefore, be determined not with reference to the above description, but instead should be determined with reference to the appended claims along with their full scope of equivalents.

What is claimed is:

1. An optical switch array assembly comprising:
   a silicon substrate,
   an optical switch array disposed in the silicon substrate,
   a driving circuit integrated in the silicon substrate with the optical switch array and forcing the optical switches on and off,
   a plurality of holes on the backside of the silicon substrate each aligned with an optical switch and guiding an optical beam to the optical switch, and
   a glass plate mounted on the top of the silicon substrate.

2. An optical switch array assembly of claim 1 further comprising a plurality of DNA probes disposed on the surface of the glass plate.

3. An optical switch array assembly according to claim 2, where said DNA probes are light-synthesized DNA probes.

4. An optical switch array assembly according to claim 2, where said light beams are directed to sites where said DNA probes are light-synthesized.

5. An optical switch array assembly of claim 1 further comprising a plurality of hybridized DNA probes disposed on the surface of the glass plate.

6. An optical switch array assembly according to claim 5, where said light beams are directed to sites where said hybridized DNA probes are light-detected.

7. An optical switch array assembly comprising:
   a silicon substrate,
   an optical switch array disposed in the silicon substrate, wherein each of the switches in said array is a Fabry-Perot cavity based optical switch,
   a driving circuit integrated in the silicon substrate with the optical switch array and forcing the optical switches on and off, and
   a plurality of holes on the backside of the silicon substrate each aligned with an optical switch and guiding an optical beam to the optical switch.

* * * * *

UNITED STATES PATENT AND TRADEMARK OFFICE
CERTIFICATE OF CORRECTION

PATENT NO. : 6,731,831 B2
DATED : May 4, 2004
INVENTOR(S) : Xiang Zheng Tu

It is certified that error appears in the above-identified patent and that said Letters Patent is hereby corrected as shown below:

Column 3,
Line 35, correct the equation to read as follows:

-- $T = [(1-R_1)(1-R_2)]/[(1-\sqrt{R_1 R_2})^2 + 4\sqrt{R_1 R_2}\sin^2(2\pi h/\lambda)]$ --

Column 7,
Line 36, correct the equation to read as follows:

-- $\lambda/(4n_{SiO_2})$ --

Signed and Sealed this

Eighth Day of February, 2005

JON W. DUDAS
*Director of the United States Patent and Trademark Office*